United States Patent Office 3,467,665
Patented Sept. 16, 1969

3,467,665
OXAZOLO- AND THIAZOLO-TROPYLIUM ALKYL-SULFATES AND PROCESS FOR PREPARING THE SAME
Genshun Sunagawa, Nobuo Soma, Junichi Nakazawa, Taiichiro Watanabe, and Yoshio Sato, Hiro-machi, Tokyo, Japan, assignors to Sankyo Company Limited, Tokyo, Japan
No Drawing. Continuation-in-part of application Ser. No. 521,520, Jan. 19, 1966. This application May 31, 1967, Ser. No. 642,350
Claims priority, application Japan, Jan. 25, 1965, 40/3,889
Int. Cl. C07d *91/42, 85/48;* A61k *27/00*
U.S. Cl. 260—302                                    8 Claims

ABSTRACT OF THE DISCLOSURE

This invention discloses novel oxazolo- and thiazolo-tropylium alkylsulfates which are useful as an intermediate for the synthesis of compounds having anti-inflammatory activity. Above mentioned compounds are prepared by treating 2-acylamino-tropone or 2-acylamino-troponethione derivatives with a dialkylsulfate.

---

This is a continuation-in-part application of our co-pending application Ser. No. 521,520, filed on Jan. 19, 1966, now abandoned.

This invention relates to oxazole- and thiazole-tropylium alkylsulfates and process for preparing the same. More particularly, it relates to a new class of oxazolo- or thiazolo-tropylium compounds of the formula

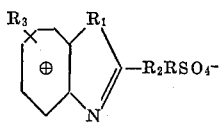

(I)

wherein R is an alkyl group containing from 1 to 5 carbon atoms such as methyl, ethyl, propyl or butyl, $R_1$ is divalent oxygen or sulfur atom, $R_2$ is phenyl group, a halophenyl group such as o-, m- or p-chlorophenyl, o-, m- or p-bromophenyl or o-, m- or p-fluorophenyl, a trihaloalkylphenyl group such as o-, m- or p-trifluoromethyl-phenyl, a nitrophenyl group such as o-, m- or p-nitrophenyl, an alkylphenyl group containing from 1 to 5 carbon atoms in the alkyl moiety such as o-, m- or p-methylphenyl, o-, m- or p-ethylphenyl or o-, m- or p-propylphenyl, an alkoxyphenyl group containing from 1 to 5 carbon atoms in the alkoxy moiety such as o-, m- or p-methoxyphenyl or o-, m- or p-ethoxyphenyl or naphthyl group, and $R_3$ is hydrogen, cyano group, an alkyl group containing from 1 to 5 carbon atoms such as methyl, ethyl, n-propyl or isopropyl, nitro group or phenyl group and also to a novel process for preparing such compounds.

The tropylium compounds of the above Formula I are novel compounds unknown in the prior art and useful as an intermediate for the synthesis of various cycloheptoxazole and cycloheptathiazole compounds which are found to possess potent anti-inflammatory activity. For example, a tropylium compound of the present invention is reacted with

to form cycloheptathiazoles or cycloheptoxazoles of the formula

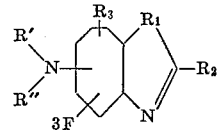

wherein $R_1$, $R_2$ and $R_3$ are as defined above, R' and R" may stand for hydrogen, alkyl, aralkyl or a heterocyclic group or R' and R" may stand for a cyclic amine formed by both of them and 3F represents 3-conjugated double bonds which may be located at any of the carbon atoms, except at the carbon atom that is linked with the group

which exhibit anti-inflammatory activity.

Typical examples of cycloheptoxazoles and cycloheptathiazoles of the above formula, prepared by us and exhibiting anti-inflammatory activity, are as follows:

6-dimethylamino-2-phenyl-6H-cycloheptoxazole,
6-morpholino-2-phenyl-6H-cycloheptoxazole,
6-piperidino-2-phenyl-6H-cycloheptoxazole,
6-dimethylamino-2-(p-chlorophenyl)-6H-cycloheptoxazole
6-morpholino-2-(p-nitrophenyl)-6H-cycloheptoxazole,
6-morpholino-2-p-tolyl-6H-cycloheptoxazole,
6-dimethylamino-2-p-tolyl-6H-cycloheptoxozole,
6-morpholino-2-p-methoxyphenyl-6H-cycloheptoxazole,
6-morpholino-2-(m-trifluoromethyl)-6H-cycloheptoxazole
6-dimethylamino-2-(m-trifluoromethyl)-6H-cycloheptoxazole,
6-dimethylamino-2-phenyl-6H-cycloheptathiazole.

INHIBITORY ACTION OF THE ABOVE-MENTIONED COMPOUNDS AGAINST VARIOUS TYPES OF INFLAMMATIONS IN RATS

A group of rats was intraperitoneally administered with the active compounds indicated in the following Table 1, and then subcutaneously injected into the planar tissue in the paw of their hind legs with a given amount of two phlogistic agents (namely, 0.05 ml. of 1 percent carrageenin and 0.05 ml. of 6 percent dextran). After a certain interval of the injection, the volume of edema produced in the said rat's paw was measured. Then, inhibitory ratio was calculated from the measured volume, as compared with that obtained in control untreated with the said active compound.

It will be apparent from the Table 1 that all of the present cycloheptoxazoles and cycloheptathiazoles, particularly, 6-dimethylamino-2-phenyl-6H-cycloheptoxazole, generally and effectively inhibit various types of inflammations.

TABLE 1.—INFLUENCES OF CYCLOHEPTOXAZOLES AND CYCLOHEPTATHIAZOLES ON THE VARIOUS INFLAMMATIONS

| Compounds | Toxicity, LD₅₀ (I.P.) | Edema | | | |
|---|---|---|---|---|---|
| | | Dextran | | Carrageenin | |
| | | Dose (I.P.) mg./kg. | Inhibitory ratio | Dose (I.P.) mg./kg. | Inhibitory ratio |
| 6-dimethylamino-2-phenyl-6H-cycloheptoxazole | 80 | 5 | + | | |
| | | 10 | ++ | 10 | + |
| | | 30 | +++ | 30 | ++ |
| 6-morpholino-2-phenyl-6H-cycloheptoxazole | 100–200 | 10 | ± | | |
| | | 20 | ++ | | |
| | | 60 | +++ | | |
| 6-piperidino-2-phenyl-6H-cycloheptoxazole | 183 | 10 | ± | | |
| | | 20 | + | | |
| | | 30 | + | | |
| 6-dimethylamino-2-(p-chlorophenyl)-6H-cycloheptoxazole | 100–300 | 10 | + | | |
| | | 15 | ++ | | |
| 6-morpholino-2-(p-nitrophenyl)-6H-cycloheptoxazole | Ca. 200 | 30 | − | | |
| | | 60 | ++ | | |
| 6-morpholino-2-p-tolyl-6H-cycloheptoxazole | Ca. 200 | 20 | ± | | |
| | | 60 | +++ | | |
| 6-dimethylamino-2-p-tolyl-6H-cycloheptoxazole | | 10 | ± | | |
| | | 20 | ++ | | |
| 6-morpholino-2-p-methoxyphenyl-6H-cycloheptoxazole | 200–400 | 30 | + | | |
| | | 60 | ++ | | |
| 6-morpholino-2-(m-trifluoromethyl)-6H-cycloheptoxazole | >300 | | | | |
| 6-dimethylamino-2-(m-trifluoromethyl)-6H-cycloheptoxazole | Ca. 100 | | | | |
| 6-dimethylamino-2-phenyl-6H-cycloheptathiazole | | 10 | − | | |
| | | 30 | ++ | | |
| | | 30 | − | | |
| Aminopyrine | | 60 | ± | 60 | ± |
| | | 120 | ++ | | |
| | | 30 | ± | 30 | ± |
| Butazolidine | | 60 | ± | 60 | + |
| | | 120 | ± | 120 | ++ |
| | | 30 | ± | 30 | ± |
| Aspirin | | 60 | ± | | |
| | | 100 | ± | 100 | + |

− 0–9% inhibition.
+ 30–49% inhibition.
++ 50–74% inhibition.
+++ More than 74% inhibition.
± 10–29% inhibition.

It is an object of this invention to provide the novel tropylium compounds of the above Formula I which are a useful intermediate for the synthesis of numerous medicinal cycloheptoxazole and cycloheptathiazole compounds.

Another object of this invention is to provide a novel process for preparing the tropylium compounds of the above Formula I.

These and other objects of this invention will be apparent from the detailed disclosure as follows.

Formerly, it has been disclosed in our U.S. patent application Ser. No. 386,734 filed on July 31, 1964, now Patent Number 3,321,520 that the 2-NHR'-tropone wherein R' is hydrogen, alkyl, phenyl or aralkyl is reacted with a lower alkyl sulfate to produce the 1-alkoxy-7-NR'-cycloheptatriene wherein R' is as defined above.

As a result of our further studies on the reaction between other 2-substituted tropone and a lower alkyl sulfate, it has now been unexpectedly found that the recation of a specific 2-substituted tropone containing an aromatic acyl amino group at the 2-position in the cycloheptatriene moiety with a lower alkyl sulfate does not give the corresponding 7-substituted-iminocycloheptatriene but gives an oxazolotropylium compound, and also that the reaction of a specific 2-substituted troponethione wherein the 2-substituent is an aromatic acyl amino group with a lower alkyl sulfate proceeds in the same fashion as for the above 2-aromatic acyltropone to yield a thiazolotropylium compound.

In accordance with this invention, the tropylium compound of the Formula I can be prepared by the novel process which comprises reacting a compound of the formula

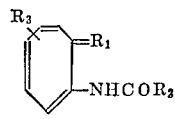

(II)

wherein $R_1$, $R_2$ and $R_3$ are as defined above with a dialkyl sulfate of the formula $$(R)_2SO_4 \qquad (III)$$

wherein R is as defined above.

In one embodiment of the process of this invention as depicted above, the reaction is carried out by heating under reflux a mixture of a compound of the above Formula II and a dialkyl sulfate of the above Formula III in an inert organic solvent. Those inert organic solvents which may be employed in the present process are desirable to be non-hydroxylic, and suitable inert organic solvents to be employed include aromatic hydrocarbons, for example, benzene, toluene, xylenes and the like and ethers, for example, dioxane and the like. Representative examples of dialkyl sulfates of the above Formula III include dimethyl sulfate, diethyl sulfate and dipropyl sulfate, but it is preferred in the present process to employ dimethyl sulfate because of its availability. The reaction time may be widely varied depending upon such factors as the reactants and solvents employed and the like, but it is usual and preferable to carry out the reaction for the period of time ranging from about 30 minutes to several hours. After completion of the reaction, the reaction product may be easily recovered from the reaction mixture by any of the conventional methods. For instance, the solvent is distilled off from the reaction mixture and the residue is washed with a suitable solvent, for example, benzene to obtain the desired product.

In an alternative and preferred embodiment of the present process, the reaction is carried out by heating a compound of the above Formula II together with an excess amount of dialkyl sulfate of the above Formula III, preferably under reduced pressure, in the absence of the above-mentioned inert organic solvent while removing alkanol which forms in the reaction, since a dialkyl sulfate acts both as a reagent and as a reaction solvent. In this case, the reaction conditions such as reaction times, reaction temperatures and pressures may be optionally selected and employed by those skilled in the art, but, usually, it is desirable to carry out the reaction at a temperature of about 80–150° C. and under a pressure of about 10–100 mm.Hg for the period of time ranging from about 30 minutes to several hours. After completion of the reaction excess dialkyl sulfate that remains unreacted is distilled off and the residue thus obtained is washed with a suitable solvent, for example, benzene to obtain the desired product.

The following examples serve to illustrate this invention and should not be construed to limit the scope thereof.

Example 1.—2-phenyloxazolotropylium monomethylsulfate

A mixture of 5 g. of 2-benzoylaminotropone and 15 g. of dimethyl sulfate in 50 ml. of toluene is refluxed for 40 minutes with stirring. The preparation of 2-benzoylaminotropone has been described, inter alia, in Scientific Reports of the Tohoku (Imperial) University, Series I, 36, 126 (1952). After cooling, the crystalline substance which precipitates is collected by suction filtration, washed with benzene and then dried in vacuo in a desiccator to give 4.5 g. of the desired product which melts at 160° C. with decomposition.

Example 2.—2-phenyloxazolotropylium monomethylsulfate

A mixture of 5 g. of 2-benzoylaminotropone and 20 g. of dimethyl sulfate is heated in an oil bath for approximately 1.5 hours at 110–120° C. under reduced pressure of 20–50 mm. Hg while removing by distillation methanol, by-product, and then a major portion of the unreacted dimethyl sulfate is distilled off under reduced pressure of 1–10 mm. Hg. After cooling, the crystalline substance which precipitates is collected by suction filtration, washed with benzene and then dried in vacuo in a desiccator to give 6.8 g. of the desired product which melts at 160° C. with decomposition.

Example 3.—2-(p-chlorophenyl)-oxazolotropylium monomethylsulfate

The same procedure as in Example 2 is repeated except that 22.7 g. of 2-(p-chlorobenzoylamino)-tropone and 90 g. of dimethyl sulfate are employed instead of 5 g. of 2-benzoylaminotropone and 20 g. of dimethyl sulfate and the reaction is carried out at 120° C. to give 2 g. of the desired product which melts at 165° C. with decomposition.

Example 4.—2-(p-methylphenyl)-oxazolotropylium monomethylsulfate

The same procedure as in Example 2 is repeated except that 11.2 g. of 2-(p-methylbenzoylamino)-tropone and 44 g. of dimethylsulfate are employed instead of 5 g. of 2-benzoylaminotropone and 20 g. of dimethyl sulfate and the reaction is carried out at 130–140° C. to give 12 g. of the desired product which melts at 160° C. with decomposition.

Example 5.—2-(p-methoxyphenyl)-oxazolotropylium monomethylsulfate

The same procedure as in Example 2 is repeated except that 15 g. of 2 - (p-methoxybenzoylamino)-tropone and 60 g. of dimethyl sulfate are employed instead of 5 g. of 2-benzoylaminotropone and 20 g. of dimethyl sulfate and the reaction is carried out at 120–130° C. to give 12.6 g. of the desired product which melts at 155° C. with decomposition.

Example 6.—2-(p-nitrophenyl)-oxazolotropylium monomethylsulfate

The same procedure as in Example 2 is repeated except that 10 g. of 2-(p-nitrobenzoylamino)-tropone and 40 g. of dimethyl sulfate are employed instead of 5 g. of 2-benzoylaminotropone and 20 g. of dimethyl sulfate and the reaction is carried out at 140° C. to give 10 g. of the desired product which melts at 169–172° C. with decomposition.

Example 7.—2-(m-trifluoromethylphenyl)-oxazolotropylium monomethylsulfate

The same procedure as in Example 2 is repeated except that 30 g. of 2 - (m-trifluoromethylbenzoylamino)-tropone and 120 g. of dimethyl sulfate are employed instead of 5 g. of 2-benzoylaminotropone and 20 g. of dimethyl sulfate to give 25 g. of the desired product which melts at 145° C. with decomposition.

Example 8.—2,6-diphenyloxazolotropylium monomethylsulfate

The same procedure as in Example 2 is repeated except that 0.5 g. of 5 - phenyl - 2 - benzoylaminotropone and 8 g. of dimethyl sulfate are employed instead of 5 g. of 2-benzoylaminotropone and 20 g. of dimethyl sulfate and the reaction is carried out at 130° C. to give 0.6 g. of the desired product which melts at 217° C. with decomposition.

Example 9.—2-phenyl-7-isopropyloxazolotropylium monomethylsulfate

The same procedure as in Example 2 is repeated except that 1 g. of 4 - isopropyl - 2 - benzoylaminotropone and 3.0 g. of dimethyl sulfate are employed instead of 5 g. of 2-benzoylaminotropone and 20 g. of dimethyl sulfate and the reaction is carried out at 100–110° C. to give 1.0 g. of the desired product as brown oily substances. The formation of the desired product is demonstrated by dissolving the product obtained as above in water, filtrating the aqueous solution and adding an aqueous chloroplatinic acid solution to the filtrate to form 2-phenyl-7-isopropyltropylium chloroplatinate which does not melt at 280° C.

Example 10.—2-(β-naphthyl)-oxazolotropylium monomethylsulfate

The same procedure as in Example 2 is repeated except that 1.0 g. of 2-(β-naphthoylamino)tropone and 15 g. of dimethyl sulfate are employed instead of 5 g. of 2-benzoylaminotropone and 20 g. of dimethyl sulfate and the reaction is carried out at 120–125° C. to give 1.2 g. of the desired product which melts at 161° C. with decomposition.

Example 11.—2-phenylthiazolotropylium monomethylsulfate

The same procedure as in Example 2 is repeated except that 7 g. of 2 - (benzoylamino)-troponethione and 30 g. of dimethyl sulfate are employed instead of 5 g. of 2-benzoylaminotropone and 20 g. of dimethyl sulfate and the reaction is carried out at 130–140° C. to give 2.2 g. of the desired product as reddish brown crystals. The preparation of 2-(benzoylamino)-troponethione has been described, inter alia, in the Bulletin of the Chemical Society of Japan, 34, 1382 (1961). The formation of the desired product is demonstrated by adding an aqueous chloroplatinic acid solution to an aqueous solution of the product obtained as above to form 2 - phenylthiazolotropylium chloroplatinate as orange crystals, which does not melt at 260° C.

What is claimed is:

1. A compound of the formula

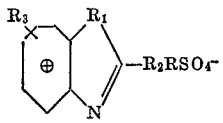

wherein R is alkyl of from 1 to 5 carbon atoms, $R_1$ is divalent oxygen or sulfur, $R_2$ is phenyl, halophenyl, trifluoromethylphenyl, nitrophenyl, alkylphenyl of from 1 to 5 carbon atoms in the alkyl moiety, alkoxyphenyl of from 1 to 5 carbon atoms in the alkoxy moiety or naphthyl and $R_3$ is hydrogen, cyano, alkyl from 1 to 5 carbon atoms, nitro or phenyl.

2. 2-phenyloxazolotropylium monomethylsulfate.
3. 2-(p-chlorophenyl)-oxazolotropylium monomethylsulfate.
4. 2-(p-methylphenyl)-oxazolotropylium monomethylsulfate.
5. 2 - (p - methoxyphenyl) - oxazolotropylium monomethylsulfate.
6. 2-(p-nitrophenyl)-oxazolotropylium monomethylsulfate.
7. 2-phenylthiazolotropylium monomethylsulfate.
8. A process for preparing a compound of the formula

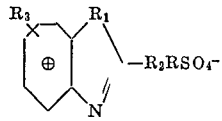

wherein R is alkyl of from 1 to 5 carbon atoms, $R_1$ is divalent oxygen or sulfur, $R_2$ is phenyl, halophenyl, trifluoromethylphenyl, nitrophenyl, alkylphenyl of from 1 to 5 carbon atoms in the alkyl moiety, alkoxyphenyl of from 1 to 5 carbon atoms in the alkoxy moiety or naphthyl and $R_3$ is hydrogen, cyano, alkyl of from 1 to 5 carbon atoms, nitro or phenyl, which comprises heating together a compound of the formula

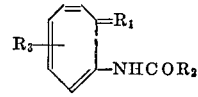

wherein $R_1$, $R_2$ and $R_3$ are as defined above with a compound of the formula

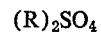

wherein R is as defined above.

References Cited
UNITED STATES PATENTS 3,149,120   9/1964   Berman et al. _____ 260—307

ALEX MAZEL, Primary Examiner

R. J. GALLAGHER, Assistant Examiner

U.S. Cl. X.R.

260—247.1, 247.5, 293.4, 294.7, 307, 558, 559; 424—270, 272